Figure 1:
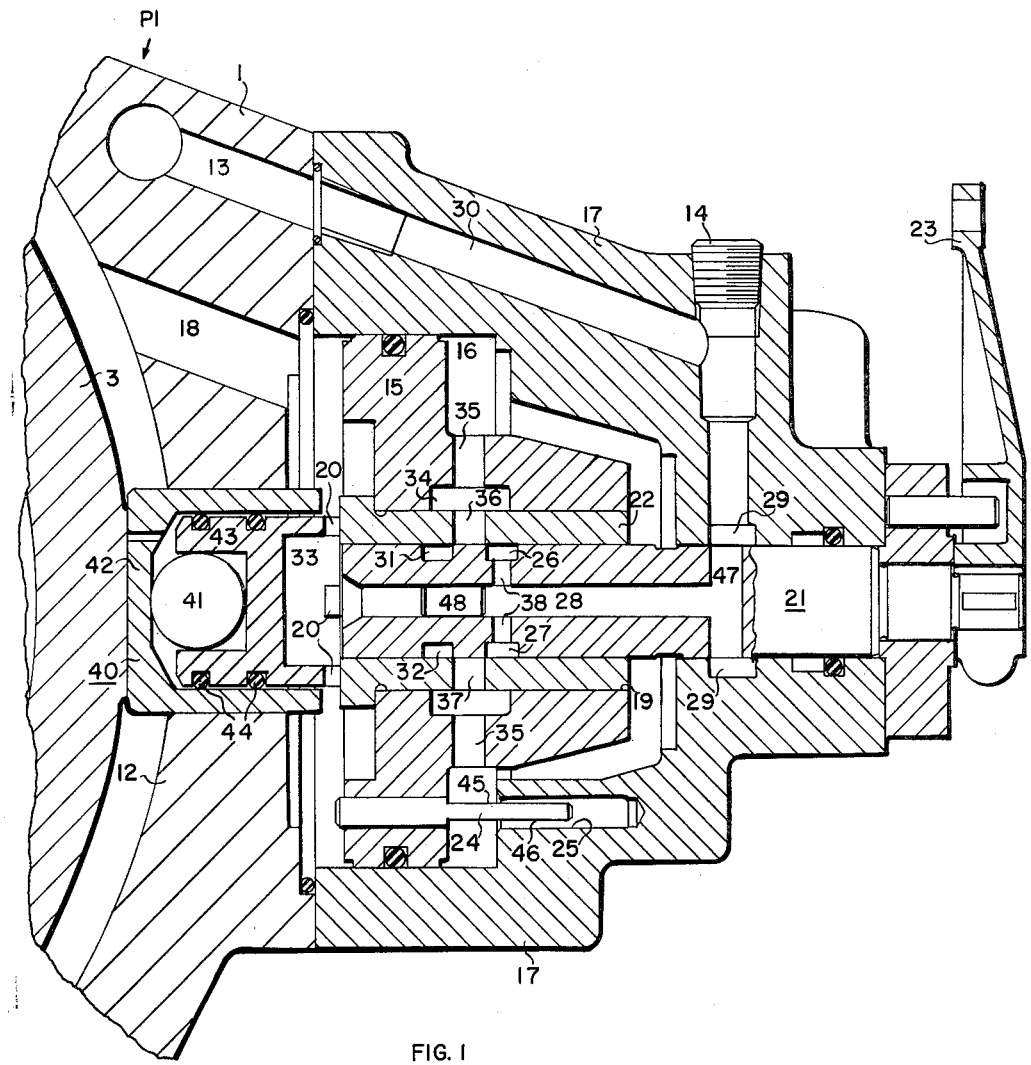

INVENTORS
ERNST WIEDMANN
ADOLF R. GRAD

ATTORNEY

March 27, 1962 E. WIEDMANN ETAL 3,026,854
PUMP CONTROL
Filed July 20, 1959 2 Sheets-Sheet 2
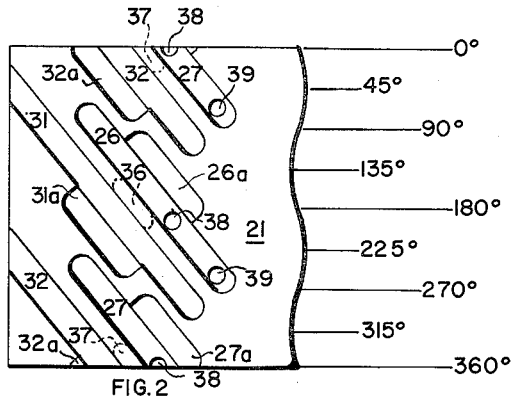
FIG. 2
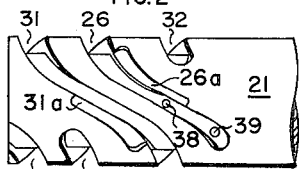
FIG. 3
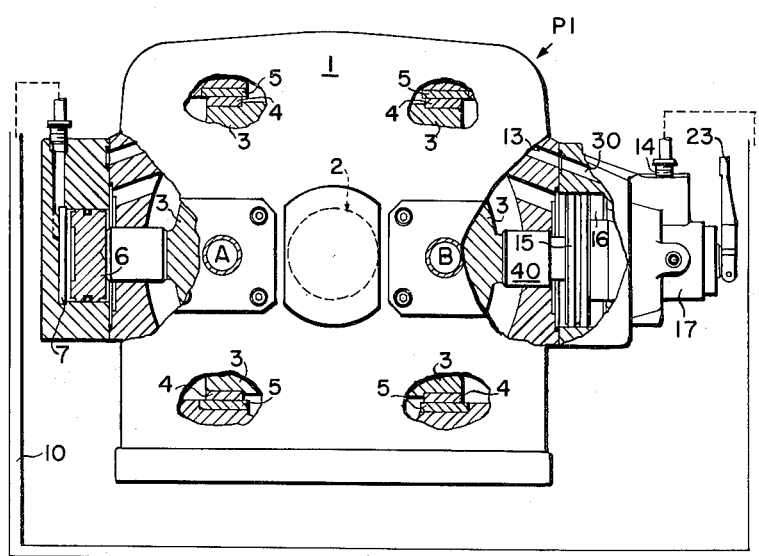
FIG. 4
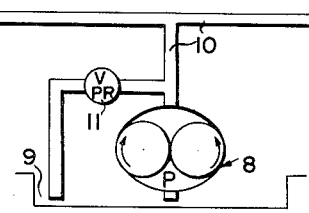
INVENTORS
ERNST WIEDMANN
ADOLF R. GRAD
*T. Lloyd LaFave*
ATTORNEY

United States Patent Office 3,026,854
Patented Mar. 27, 1962

3,026,854
PUMP CONTROL
Ernst Wiedmann, Oconomowoc, and Adolf R. Grad, Milwaukee, Wis., assignors to The Oilgear Company, Milwaukee, Wis.
Filed July 20, 1959, Ser. No. 828,251
9 Claims. (Cl. 121—41)

This invention relates to a control for varying the displacement of a hydraulic pump or motor particularly of the type having a displacement varying member shiftable in opposite directions from a zero displacement position to a maximum displacement position.

The invention is explained as being embodied in a pump, for convenience of description, although it may similarly be embodied in a motor.

The pump stroke or displacement varying member is continuously urged in one direction and a control means regulates a modulated control force urging the displacement member in an opposite direction. The displacement member is restrained from movement in any other direction.

Since the displacement member must be free to move in the direction for varying pump stroke, the displacement member cannot be preloaded. Consequently, pumping forces may cause tilting and radial displacement of the displacement member relative to its normal direction of movement and relative to a control structure applying the modulated control force to the displacement member. Similarly, misalignment between the displacement member and the control structure creates forces interfering with the operation of the control structure.

The control structure includes a control piston that is also substantially restrained against radial movement and a valve having a rotatable control member that is radially restrained and a follow-up valve member that may be formed as a part of the control piston to provide a follow-up action of the valve for modulating the control force applied to the piston.

The valve is constructed to provide hydraulic balance between its parts, and a thrust transmitting means is provided in combination with the control and valve structure to compensate for relative misalignment and radial movement of the displacement member and valve to avoid cramping or binding between the members of the valve so that it is easily operated. It is an object of the invention to provide a hydrodynamic machine having a displacement varying member controlled by a valve having a member that follows the movement of the displacement varying member without cramping or binding the valve.

Another object of the invention is to provide a follow-up type of control for the displacement varying member of a pump and operatively connect them by thrust transmitting means so that relative misalignment or radial displacement does not bind or cramp the control.

Other objects and advantages may be apparent from the description and accompanying drawing which shows:

FIG. 1 is a central vertical section through a pump control embodying the invention;
FIG. 2 is a developed view showing the peripheral surface of a portion of the valve of FIG. 1; and
FIG. 3 is an end view partly in section of the pump of FIG. 1 and in part a schematic view showing the hydraulic circuit which provides the control power.

The pump P1 shown in FIG. 4 is a well known type which has been in extensive commercial use for many years. It is deemed sufficient to state herein that the pump has its mechanism arranged within and supported by a case 1 having two ports A and B by means of which it may be connected to an external circuit; that the pump mechanism includes a central valve shaft or pintle 2 which is rigidly secured in one end wall of case 1, a cylinder barrel (not shown) which contains the pumping pistons and cylinders and is journalled upon pintle 2, and a displacement varying member or slide block 3 which is slideable transversely of pintle 2 but is restrained from movement in any other direction; and that pump P1 will discharge liquid in a direction and at a rate determined by the direction and distance the axis of slide block 3 is offset from the axis of pintle 2, pump displacement being zero when the axis of slideblock 3 is coincident with the axis of pintle 2 and being maximum when the axis of slide block 3 is offset the greatest distance from the axis of pintle 2.

Slide block 3 is sometimes mounted between roller bearings but has been shown provided at each of its corners with a slide plate 4 which engages a bearing plate 5 fixed to case 1. Somewhat similar means (not shown) are provided to prevent movement of slide block 3 axially of pintle 2. Slide block 3 with the slide plates thereon is fitted between the bearing plates as closely as is possible and still permit it to be moved transversely of pintle 2.

In a pump provided with a control of the type in which the invention is embodied, the slide block 3 thereof is continuously urged toward the right by a substantially constant force which in some instances is provided by a spring or springs and in other instances is provided as shown by a piston 6 which is fitted in a cylinder 7 carried by the left side wall of case 1, FIG. 5.

Piston 6 is energized by liquid supplied to cylinder 7 by a gear pump 8 which draws liquid from a reservoir 9 and discharges it into a supply channel 10 one branch of which is connected to cylinder 7. The liquid discharged by pump 8 in excess of requirements is exhausted through a relief valve 11 which enables pump 8 to maintain a constant pressure in channel 10.

Pump 8 and reservoir 9 have been shown separate from pump P1 but actually pump 8 is driven in unison with pump P1 and is arranged within its case 1 and reservoir 9 constitutes a base upon which pump P1 is mounted which is according to common practice. A part of the liquid discharged by pump 8 may also be employed for other purposes than described herein. Within the case 1 the channel 10 from gear pump 8 is connected to channel 13, FIG. 1, and for an external supply, the channel 10 from the gear pump is connected to the head at pipe plug 14.

The pump P1 includes an end head 17 that may be integral with the case 1 or as shown in FIG. 1 detachably mounted on an end wall or flange 12 of the case. A cylinder is formed in the end head and a piston 15 is closely fitted therein and is adapted to move the slide block to the left in opposition to piston 6.

Piston 15 has a larger pressure area than piston 6 and the admission of pressure fluid from pump 8 to cylinder 16 and the exhaust of fluid therefrom is controlled by valve means to provide a modulated control force urging piston 15 in a direction opposing piston 6. The slide block 3 will move to the left or right respectively, depending on whether the control force is greater or less than the bias force applied by piston 6. Because of some leakage in the system the valve means throttles liquid to cylinder 16 to hold the slide block stationary in any position.

The valve means comprises a control valve 21 and a valve cylinder 22 movable as a follow-up member. Valve 21 is radially rigidly supported in journalled relation to the end head 17 for rotation therein in axial alignment with the center of piston 15. Piston 15 may serve as the valve cylinder or as shown the valve cylinder is a valve sleeve fitted in a central bore 19 through piston 15 so that the valve sleeve is axially and radially rigid with the piston 15. The valve 21 extends into valve sleeve 22 for rotation therein and for permitting movement of the valve sleeve and piston axially of the valve 21. Any tilting or radial displacement of the piston 15 would therefore cause a binding relationship between the valve 21 and the valve sleeve 22.

Valve 21 which is journalled for rotation in end head 17 is adapted to be rotated by suitable means such as a lever 23 fixed on the end of the valve 21. Rotation of the valve sleeve 22 is prevented by a pin 24 axially disposed in press fit relation in a bore in the piston and extended in reciprocable relation in a bore 25 in the end head. The end portion of pin 24 reciprocable in bore 25 has a diameter slightly less than that of bore 25 and has diametrically opposite flat surfaces positioned radially of the axis of valve 21, and therefore may have limited movement in bore 25 radially of valve 21 but not circumferentially of the valve.

Valve 21 has formed in its peripheral surface a pair of diametrically opposite spiral inlet grooves 26, 27 or pressure grooves in communication with a central passage 28 which opens to ports 29 in the end head which in turn communicate by a passage 30 to a passage 13 in case 1 which in turn connects to a branch 10 of gear pump 8. Central supply passage 28 is formed by a bore in valve 21 in communication with a large radial inlet hole 47 through the valve and two smaller radial outlet holes 38, 39 through the valve. A plug 48 disposed in the bore closes passage 28 between outlet hole 38 and the free end of the valve. Valve 21 also has formed in its peripheral surface a pair of diametrically opposite spiral outlet grooves 31, 32, spaced axially of the inlet pressure grooves 26, 27, and are nearer the free or piston end of the valve. Exhaust spiral grooves open into a chamber 33 adjacent the free end of valve 21. Chamber 33 is connected by passages 20 to an exhaust chamber on the inner or slide block side of the piston 15, and from there through a drain groove 18 to reservoir 9 in case 1.

FIG. 1 shows fluid passage to cylinder 16 formed by an annular groove 34 in the wall of the central bore 19 in the piston 15, and by connecting radial passages 35 open to the cylinder 16. Diametrically opposite radial ports 36, 37 through the valve sleeve are centered relative to the annular groove 34 in the piston bore. These valve sleeve ports are equal in width to the axial spacing between the spiral inlet and outlet grooves in the valve 21 and have edges parallel therewith so that relative rotation or axial movement of the valve 21 and valve sleeve 22 brings the cylinder ports 36, 37 in communication with either the inlet grooves or the outlet grooves for connecting the cylinder 16 to either the source of pressure fluid or to exhaust, until the follow-up action of the control structure causes the ports in the valve sleeve 22 to again be centered between the pressure and exhaust grooves of the valve 21.

The arrangement of the pressure and exhaust grooves in valve 21 is clearly shown in FIGS. 2 and 3. FIG. 2 includes an indication by dotted lines of cooperating ports 36 and 37 in the sleeve 22. From these figures it can be seen that those portions of the pressure grooves 36 and 37 in a radial plane are 180 degrees apart, and similarly those portions of the exhaust grooves 31 and 32 in a radial plane are 180 degrees apart. The grooves shown in the developed view of FIG. 2 are parallel spirals and alternately are pressure and exhaust grooves, viewed from the ports 36 or 37 in the sleeve which moves axially and circumferentially relative to the valve 21 upon movement of the sleeve of the valve. The adjacent edges of the grooves are parallel with each other and with the spiral edges of the port in the sleeve to cooperate and form orifices with the edges of the port upon movement of the valve or sleeve. Recesses are formed in the periphery of valve 21 to extend, within the operating limits of the valve, the effective area of the pressure and exhaust grooves along their edges normally remote from the position of ports 36 and 37, and these recesses bear reference characters 26a, 27a, 31a, and 32a.

The pressure grooves 26 and 27 together extend circumferentially substantially entirely around the valve. The exhaust grooves 36 and 37 in a circumferential sense overlap because they are continued until they run out to provide exhaust openings at the axial end of valve 21.

Radial holes 38, 39 extend diametrically through valve 21 and each connects pressure grooves 26 and 27 to central supply passage 28. Holes 38 and 39 are spaced axially of each other and circumferentially about 60 degrees.

The arrangement of the spiral grooves having diametrically opposite corresponding spiral grooves and the port in the sleeve having a diametrically opposite port provides hydraulic balance between the valve 21 and valve sleeve 22. The design of the arrangement, moreover, is preferably such that 50 degrees of rotation of valve 21 from its neutral position will cause full displacement or eccentricity of the slide block 3 relative to the axis of pintle 2.

When pump P1 is creating a high pressure, the forces created in the pump may cause displacement of the slide block radially of the valve 21. Also, variable friction forces on the slide block may cause the slide block to tilt relative to its alignment with the control piston and valve 21. Further, misalignment due to machine tolerances may cause the opposing thrust faces of the slide block and control piston to be nonparallel. Such misalignment and relative radial movement between the slide block and piston must be compensated for so that they do not result in binding friction between the valve and valve body. Accordingly a thrust transmitting means is employed between the piston and the slide block that cooperates with the valve arrangement to eliminate or substantially reduce the bending moment on the valve and friction between the valve and its cylinder.

The thrust transmitting means comprises a wobbler structure 40 providing in effect a point contact with the slide block 3 and a point contact with the piston 15 to reduce the bending moment of frictional forces acting radially of the valve 21. The wobbler may be a longitudinally rigid member having spherical ends having a common center of curvature and preferably, as shown is a hardened steel ball 41 resiliently centered in the flange 12 of the pump case 1 between the slide block 3 and the control piston 15.

The ball 41 is axially confined between a pair of telescoping plungers 42, 43. The outer plunger 42 is cup shaped and journalled for reciprocable movement in the case flange 12 in axial alignment with the valve 21; the closed end of the outer plunger is adapted to abut a flat surface of the slide block 3. The inner plunger 43 is also cup shaped and fits loosely in the outer plunger 42. The fit between the inner and outer plungers is shown exaggerated in FIG. 1 and is preferably of the order of .030 inch difference between their respective diameters. Resilient means such as a pair of rubber O-rings 44 are disposed in annular grooves in the cylindrical periphery of the inner plunger 43 and serve to space the cooperating plungers radially of each other. The ball 41 is seated within the cup portion of the inner plunger 43 and in abutment with a flat bottom face of the outer plunger. The other end of the inner plunger 43 abuts the inner face of the piston 15 or the flanged end of valve sleeve 22 and is coaxial therewith so that the thrust transmitting ball 41 is centered on the axis of the valve 21.

A drain hole 45 in the upper portion of plunger member 42 opens to the slide block face to provide a drain from the interior of the plunger to the interior of the case 1 for fluid trapped in the plunger.

The resilient radial floating relation between the inner and outer plungers and the ball axially confined therebetween thus cooperate to permit the plungers to seat on the faces of the piston and slide block and adjust for angularity therebetween and also permit relative radial and tilting movement while maintaining the thrust centered on the axis of the valve 21.

The arrangement shows the inner plunger 43 is tubular or bored to a diameter for receiving the free end of the valve 21 upon follow-up movement of the valve sleeve 22 on the valve 21. The end of the inner plunger that abuts the piston 15 is provided with radial slots or passages 20 for the passage into the casing of fluid exhausting from chamber 33 adjacent the end of valve 21.

The pump is operable to discharge motive fluid at variable rates from either pump ports A or B in accordance with the command position of the control lever 23. With control lever 23 rotated clockwise 50 degrees of the neutral command position shown in FIG. 1, the exhaust ports 31, 32 of valve 21 register with cylinder sleeve ports 36, 37 to exhaust fluid from cylinder 16 until the sleeve 22 is moved to the right to cut off flow from cylinder 16. Cut off occurs when piston 6 has moved the pump slideblock to a full stroke position to the right of its zero stroke position. Obviously, counterclockwise rotation of the control lever will effect movement of the slideblock to the left in accordance with the degree of movement of the control lever; with counterclockwise rotation of valve 21, its pressure ports 26, 27 register with sleeve ports 36, 37 respectively to admit control pressure fluid to the control cylinder 16. Piston 16 overcomes piston 6 and moves the slideblock to the left until sleeve ports 36, 37 no longer register with the valve pressure ports, thereby cutting off flow of control pressure fluid to control cylinder 16.

If control lever 23 is positioned 50 degrees left of its neutral command position, the pump slideblock will move to the left of its zero stroke position to a full stroke position causing the pump to discharge motive fluid from pump port B.

The reaction of pumping forces on the pump slideblock 3 and the control forces for positioning the slideblock have components that vary and that are not coaxial of the control piston 15 and of valve 21. These component forces are minimized by the thrust transmitting means 40 which includes ball 41 that is centered coaxially of valve 21.

The single embodiment of the invention shown and described thus included a radially rigid rotary valve hydraulically balanced in a valve cylinder that exerts axial thrust on a controlled displacement member through a thrust transmitting means arranged to cooperate with the valve cylinder to reduce and eliminate friction in the valve due to reaction forces between the displacement member and the valve. Various changes may be made in the embodiment shown within the spirit of the invention and the scope of the appended claims.

We claim:

1. A control for a hydrodynamic machine having a casing, a displacement varying member in said casing, and means urging said displacement member in one direction, said control comprising a cylinder, a piston fitted in said cylinder, and valves means controlling a flow of fluid from a source to said cylinder to provide a modulated control force urging said piston to move said displacement member in an opposite direction, said valve means comprising a cylindrical valve member having one end radially rigidly supported and the other end journalled in said piston for relative reciprocable movement therebetween, said piston having a port to said cylinder adapted to register with inlet and outlet ports in said valve member, and thrust transmitting means operatively disposed between said piston and said displacement member, said thrust transmitting means comprising a ball resiliently centered in said casing on the axis of said valve member to compensate for misalignment and reduce the bending moment of reaction forces acting on said valve member.

2. A control for the hydrodynamic machine of claim 1 in which said thrust transmitting ball is axially confined between a pair of telescoping plungers, the outer one of said plungers being journalled for reciprocable movement in said casing between said displacement member and said piston, the inner one of said plungers fitting loosely in said outer plungers, and said thrust transmitting means further including resilient means radially spacing said plungers from each other, so that said plungers may adjust for angularity between the adjacent faces of said piston and said displacement member each in axial abutment with a different one of said plungers.

3. In a hydrodynamic machine having a case supporting a displacement varying member adapted for reciprocable movement and urged in one direction by a constant force and in an opposite direction by a piston subject to a modulated control force provided by valve means comprising said piston and a member rotatable in said piston, thrust transmitting means disposed coaxially of said valve member between said piston and said displacement member and supported for reciprocable movement therewith, said thrust transmitting means comprising an outer plunger and a radially loosely fitting inner plunger with one abutting said displacement member and the other abutting said piston, resilient means spacing said plungers radially of each other, and a ball disposed axially between said plungers and seated in one of said plungers so said ball is centered on the axis of said valve member.

4. In a hydrodynamic machine having a case supporting a displacement varying member adapted for reciprocable movement and urged in one direction by a constant force and in an opposite direction by a piston subject to a modulated control force provided by valve means having a member movable with said piston, thrust transmitting means disposed coaxially of said valve member between said piston and said displacement member and supported for reciprocable movement therewith, said thrust transmitting means comprising in axial alignment with said piston a pair of telescoping cup shaped members and a ball rotatably confined in the inner one of said members in contact with a face of the outer one of said members, and resilient means radially disposed between said telescoping members to normally space said members coaxially of one another and to permit misalignment of one relative to the other so as to substantially reduce any restraint to the operation of said valve means.

5. In a hydrodynamic machine having a case supporting a displacement varying member adapted for reciprocable movement and urged in one direction by a constant force and in an opposite direction by a piston subject to a modulated control force provided by valve means having a member movable with said piston, thrust transmitting means disposed coaxially of said valve member between said piston and said displacement member and supported for reciprocable movement therewith, said thrust transmitting means comprising telescoping cylindrical members radially spaced from each other by resilient means disposed therebetween, and a ball axially confined between said telescoping members.

6. In a hydrodynamic machine having a case, a displacement varying structure in said case and continuously urged in one direction, means providing a modulated control force urging said displacement structure in an opposite direction comprising a cylinder formed in an end head carried by said case, a piston fitted in said cylinder, a source of pressure fluid and a drain, valve means controlling the admission of said pressure fluid to said cylinder and the exhaust of fluid from said cylinder to said drain, said valve means including a rotatable valve member having one end journalled in radially rigid relation in said end head and the other end journalled in a closely fitting valve body, said valve body being rigidly secured for non-rotatable axial movement with said piston, said valve body having diametrically opposite ports connected to said cylinder, said rotatable valve member having a pair of diametrically opposite spiral inlet grooves and a pair of diametrically opposite outlet grooves in its periphery which are axially spaced from said inlet grooves to the extent of the axial width of said ports in said valve body for operatively connecting said ports to said source of pressure fluid or to exhaust or for operatively disconnecting said ports from said inlet and outlet grooves for cutting off flow through said ports dependent upon relative axial or rotary movement between said valve member and said valve body, said rotary valve member and said valve body being constructed and arranged that said spiral inlet grooves and outlet grooves in said valve member always register with equal and diametrically opposite surface areas of said valve body and that said ports in said valve body always register with equal and diametrically opposite surface areas of said valve member for maintaining radial hydraulic balance between said valve member and said valve body, and thrust transmitting means substantially reducing bending moment on said valve member due to forces between said piston and said displacement member, said thrust transmitting means comprising a member reciprocable through said casing in axial alignment with said valve member and having a spherical surface for transmitting thrust between the adjacent faces of said displacement member and said piston.

7. In a hydrodynamic machine defined in claim 6, said thrust transmitting means including relatively loosely fitting telescoping plungers with a ball axially confined between said plungers and centered on the axis of said valve, and resilient means concentrically spacing said plungers with each other.

8. A control for a hydrodynamic machine having a case, a displacement varying member in said case, means urging said displacement member in a given direction, a source of pressure liquid, said control comprising a cylinder carried by said case, a piston closely fitted in said cylinder, valve means comprising a valve member rigidly secured to said piston and a valve cooperating to control the flow of fluid from said source to said cylinder to provide a modulated control force urging said piston to move said displacement member in an opposite direction, said valve member, valve and piston being substantially free of radial play with respect to said cylinder, thrust transmitting means disposed between said displacement member and said piston, and means supporting said thrust transmitting means in said case coaxially of said valve for taking up misalignment and tilting movement of said displacement member relative to said valve so as not to restrain the operation of said valve means.

9. A control for a hydrodynamic machine having a displacement varying member in a casing for the machine, means urging said displacement member in one direction, a servomotor including a cylinder and a piston for urging said displacement member in an opposite direction, said piston fitted in substantially radially rigid relation in said cylinder, said piston having a valve receiving coaxial bore and a port therein open to said cylinder, a valve journalled in said bore in said piston and journalled in an end of said cylinder, said piston, valve and cylinder being substantially radially rigid of each other, said valve having spiral supply and exhaust grooves normally disposed on opposite sides of said port for operative connection therewith upon relative movement between said piston and said valve, thrust transmitting means disposed between said displacement member and said piston, and means supporting said thrust transmitting means coaxially of said piston so that misalignment and tilting of said displacement member does not restrain operation of said valve.

References Cited in the file of this patent
UNITED STATES PATENTS

| | | |
|---|---|---|
| 1,890,010 | Vickers | Dec. 6, 1932 |
| 2,324,750 | Wiedmann | July 20, 1943 |
| 2,744,502 | Frantz | May 8, 1956 |
| 2,840,045 | Douglas | June 24, 1958 |
| 2,883,971 | Ayers | Apr. 28, 1959 |
| 2,889,813 | Douglas | June 9, 1959 |

FOREIGN PATENTS

| | | |
|---|---|---|
| 464,891 | Great Britain | Apr. 27, 1937 |